Patented May 23, 1939

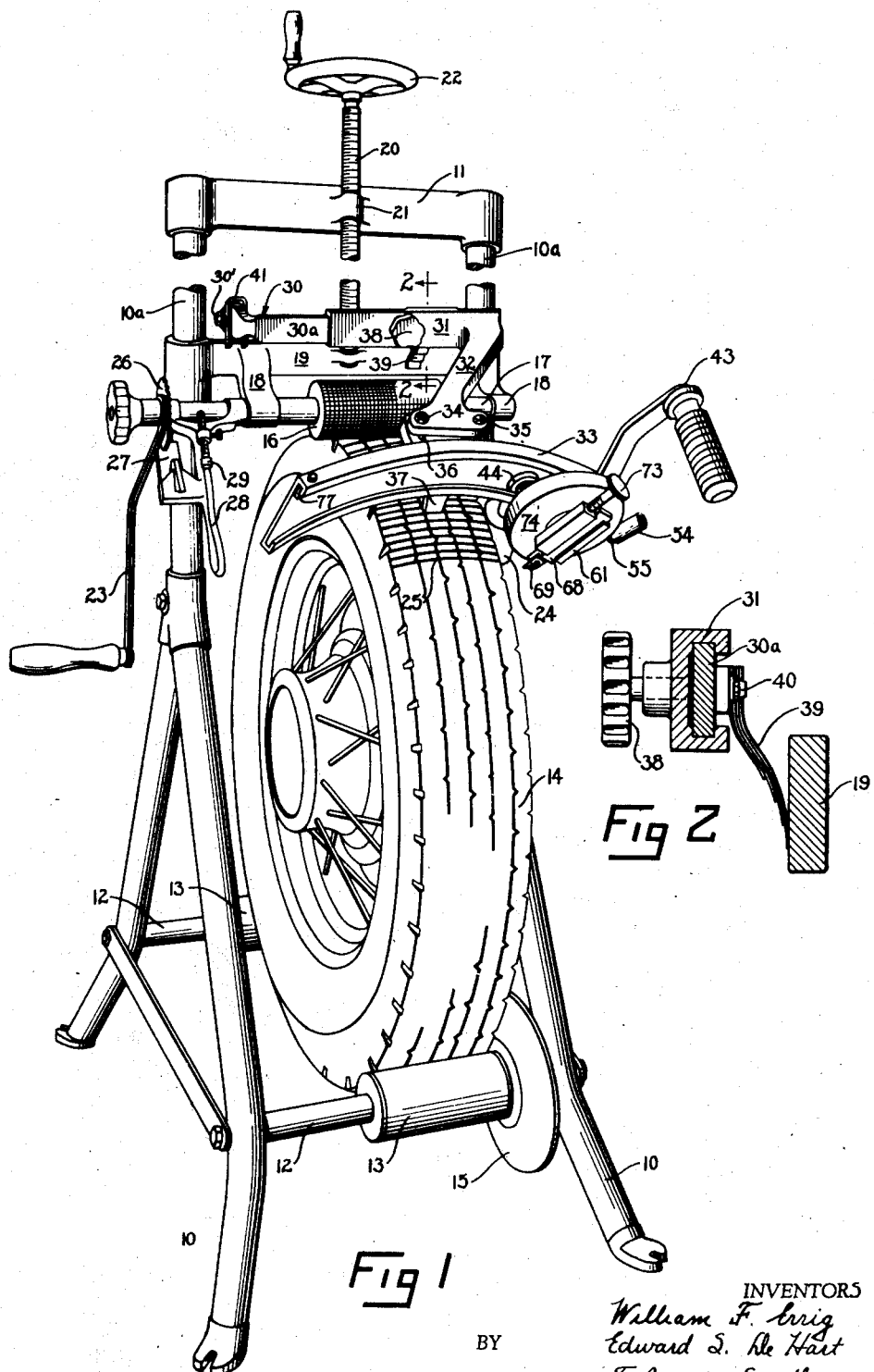

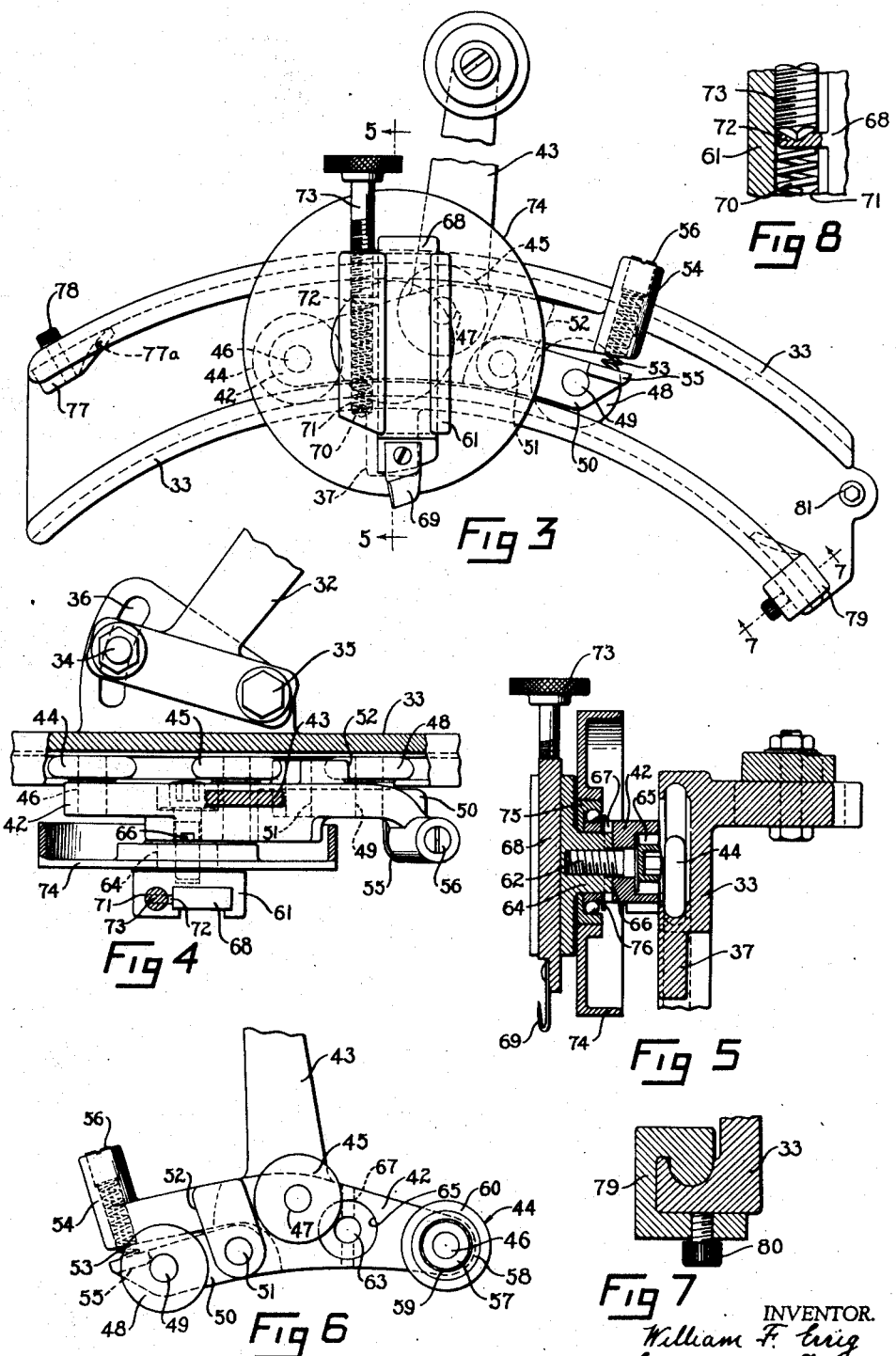

2,159,786

UNITED STATES PATENT OFFICE 2,159,786

SUPPORT

William F. Errig, Philadelphia, Pa., and Edward S. De Hart, Collingswood, N. J., assignors to Peco Manufacturing Corporation, Philadelphia, Pa., a corporation of Pennsylvania Application March 25, 1937, Serial No. 133,007

20 Claims. (Cl. 90—24)

This invention relates to supports and more particularly to movable supporting means adapted for use in movably supporting a member, such as the cutting element of a device for making incisions in automobile tires, for example.

One of the objects of the present invention is to provide novel supporting means for an element which is so constructed as to automatically compensate for wear and inaccuracies in the machining of some of the moving parts thereof.

Another object of the invention is to provide apparatus for cutting incisions in automobile tires embodying novel supporting means for the cutting element thereof.

Still another object is to provide novel means for movably supporting a member, which means is so constructed that a minimum of effort is required to move said member.

A further object is to provide novel simplified apparatus for cutting incisions of predetermined length and depth in articles, such as automobile tires.

A still further object is to provide novel supporting means embodying a track or guide and a carriage associated therewith which are so constructed as to insure a firm, yielding engagement between the carriage parts and track at all times, irrespective of machining inaccuracies and wear.

Another object is to provide a novel carriage movably mounted on track means having stop means for limiting the movement of said carriage, the latter embodying novel cushioning means.

The above and further objects and novel features of the invention will more fully appear from the following detailed description when the same is read in connection with the accompanying drawings. It is to be expressly understood, however, that the drawings are for the purpose of illustration only and are not intended as a definition of the limits of the invention, reference being had primarily to the appended claims for this latter purpose.

In the drawings, wherein like reference characters refer to like parts throughout the several views, Fig. 1 is an isometric view, partly in section and with parts broken away, showing a tire grooving device embodying one form of the present invention;

Fig. 2 is a detail sectional view, taken substantially on line 2—2 of Fig. 1;

Fig. 3 is a front elevation, on an enlarged scale and with parts broken away, of the novel supporting means of the embodiment of Fig. 1;

Fig. 4 is a top plan, partly in section and with parts broken away, of said supporting means;

Fig. 5 is a sectional view, taken substantially on line 5—5 of Fig. 3;

Fig. 6 is a detail view, partly in section and with parts broken away, of the supporting means of Fig. 3 viewed from the opposite side;

Fig. 7 is a detail sectional view on an enlarged scale, the section being taken on line 7—7 of Fig. 3; and, Fig. 8 is a detail view, partly in section, showing a portion of the means positioning the cutting element.

A single embodiment of the invention is illustrated, by way of example, in the accompanying drawings, in the form of novel supporting means for the cutting element of apparatus designed for cutting transverse and diagonal incisions in the peripheral surfaces of automobile tires to provide suitable and highly effective tread on either new or used tires. Although said supporting means may be embodied in various other types of apparatus and combined with other types of tire treating devices, the same, in the form shown, are embodied in an attachment adapted to be mounted on a frame or standard which also rotatably supports a tire to be treated, said attachment constituting an adjustable track and a novel carriage associated therewith whereby a cutting element and control means therefor may be supported and moved in a desired manner relative to said tire with a minimum of frictional resistance for making incisions of predetermined depth therein.

The tire supporting frame, as illustrated in the drawings, comprises a pair of laterally spaced, inverted Y-shaped standards 10, 10 held in spaced relation with respect to each other by a cross-piece 11 which joins the upwardly extending portions 10a of said standards and a pair of shafts 12 extending between the corresponding legs of said standards, each of said shafts having a roller 13 rotatably mounted thereon. Said rollers are thus suitably spaced for supporting a tire 14 for rotation in a vertical plane, each roller being provided with a flange or disc 15 adapted to engage one side of said tire.

For the purpose of imparting rotary motion to tire 14, and to render the apparatus suitable for use in treating tires of different sizes without altering or changing the parts of said apparatus, a roughened driving roller 16, which is adapted to engage the surface of tire 14 adjacent the top thereof, is rigidly secured to a shaft 17 that is rotatably supported by suitable brackets 18, 18 which are formed integrally with and project forwardly and downwardly from a vertically adjustable cross-bar or support 19, the ends of which slidably engage and are guided by posts 10a. Bar 19 and, hence, drive roller 16 are supported and rendered vertically or radially adjustable with respect to tire 14 by any suitable means, such as screw 20, which threadedly engages a lug 21 on cross-piece 11 and is connected at its lower end to bar 19 for rotary movement relative thereto. Roller 16 may thus be readily lowered and raised into and out of firm frictional engagement with the surface of tire 14 by rotating screw 20. A hand-wheel 22 is provided on the upper end of said screw to facilitate the turning thereof and, hence, facilitate the adjustment of said roller.

Tire 14 being thus supported on rollers 13, 13 and contacted by drive roller 16 may be rotated about a fixed axis by actuating said drive roller and, for this latter purpose, a crank 23 is provided on the outer projecting end of shaft 17. The axes of rollers 13 and 15 are preferably so disposed with respect to each other and with respect to the plane of rotation of tire 14 that, when said tire is gripped between said rollers and rotated in a counter-clockwise direction, as viewed in Fig. 1, by the turning of crank 23, the same is automatically held in a vertical plane with the sides thereof engaging discs or flanges 15 on rollers 13 and one or more tapered rollers 24 which are supported by any suitable means (not shown) secured to frame 10.

In order to insure proper and uniform peripheral spacing of grooves or incisions 25, which are to be cut in the periphery of tire 14 by means and in a manner to be fully pointed out hereafter, means are provided for intermittently moving said tire through predetermined angular distances. Said means, in the form shown in Fig. 1, comprises a ratchet wheel 26 mounted on shaft 17 for rotation therewith and a coacting resilient pawl 27 which is in constant engagement with said ratchet and is carried by a laterally extending portion of a lever 28, the latter being loosely mounted on shaft 17 for angular movement relative thereto. Thus, when lever 28 is raised and then moved to its lowered position, shaft 17 and, hence, roller 16 will be actuated through the coaction of pawl 26 and ratchet 27, and tire 14 will be rotated in a counter-clockwise direction through a predetermined angular distance determined by the extent of the downward movement of said lever. A set screw 29 is provided in an upwardly extending lug on lever 28 and is adapted to engage shaft 17 between the arms of a bifurcated portion of said lever. Said screw thus limits the angular movement of lever 28 and accordingly constitutes means for adjusting the angular movement of tire 14 for each actuation of said lever and, hence, the distance between incisions 25.

Any suitable means may be provided for mounting the novel cutter supporting attachment on frame 10, 10, said means, in the form shown, being constituted by a bracket 30, a laterally extended arm 30a of which has telescopic engagement with a channel-shaped arm 31 of an angular member 31, 32. A downwardly and forwardly extending arm 32 of said member has a channel-shaped guide or track 33, which is preferably arcuately shaped, adjustably mounted thereon by means of a pair of bolts 34 and 35, the former of said bolts engaging a slot 36 in a rearwardly extending lug on said track, whereby the latter may be adjusted to extend either transversely or diagonally across tire 14. By sliding member 31, 32 on bracket arm 30a, the center or highest point of track 33, which is located by a depending pointer or lug 37, may be adjusted to a position vertically above the center of tire 14 and may be secured in said position by any suitable means, such as a set screw 38.

To prevent the entire weight of track 33 and the parts carried thereby from resting on tire 14 and hindering the rotation thereof by roller 16 and to assist the operative in lifting said track and parts for a purpose to appear hereafter, resilient means are provided for yieldingly resisting the downward movement of said track. In the form shown, said means are constituted by a curved leaf spring 39 (Fig. 2), one end of which is secured to arm 30a by a bracket 40 and the other or lower end of which slidably engages cross-bar 19. For positively holding track 33 in raised position when desired, a U-shaped element 41 is pivotally mounted on bracket 30 in such position that the lower end thereof may be caused to engage the top of bar 19 when said track is lifted. Said element is shown in inoperative position in Fig. 1.

Novel means are provided in combination with track 33, whereby a cutter or other tire treating tool may be supported and moved with very little effort across tire 14 for making incisions of measured depth and length therein, said means being so constructed as to automatically compensate for wear of the track and the portions of the carriage engaging the same. In the illustrated embodiment, said means are constituted by a carriage which is more clearly shown in Figs. 3 to 6, inclusive, and includes a member 42 having a handle 43 rigidly secured thereto or formed integrally therewith and a pair of rollers 44 and 45, rotatably mounted on studs 46 and 47, respectively, which are rigidly secured to said member. Roller 44 is mounted adjacent one end of member 42 and is adapted to engage the lower groove or bearing surface of track 33, whereas roller 45 is mounted adjacent the center of said member and is adapted to engage the upper channel or bearing surface of said track (Fig. 3). Said rollers, in effect, constitute portions of members 42 and 50 which engage the bearing surfaces of track 33.

For the purpose of maintaining rollers 44 and 45 in firm yielding engagement with the opposed bearing surfaces or tracks of members 33 and thereby obviating any binding or looseness between said rollers and the track by reason of inaccurate machining, wear, or the presence of rust, dirt or the like, a third roller or wheel 48 adapted to engage the lower channel of said track member is rotatably mounted on a stud 49 projecting from the outer end of arm 50 which is, in turn, pivotally mounted on member 42 by means of a pivot 51. The lower portion of member 42 is cut away at one end to accommodate lever 50 and pin 51 is fixedly supported by a lug 52 formed integrally with said member and extending rearwardly therefrom (Fig. 4) into the plane of rollers 44, 45 and 48.

Yielding means tending to separate the adjacent ends of member 42 and arm 50, whereby yielding contact between rollers 44, 45 and 48 and track 33 is insured at all times, are provided in the form of a coil spring 53. Said spring, as shown, is housed in a bored portion 54 of member 42 and engages a laterally extending lug 55 formed integrally with arm 50. The compression of spring 53 may be readily adjusted by means of a plug or screw 56 which threadedly engages the inner walls of portion 54 and constitutes a seat for the upper end of said spring.

Rollers or wheels 44, 45 and 46 are preferably novelly constructed, the details of only one of said rollers being shown for the purpose of clarity. As best shown in Fig. 6, roller 44 comprises an inner ball-bearing race 57 which has a drive fit on stud 46 and supports an outer race 58 by means of a plurality of balls 59. The periphery of roller 44 is constituted by a rim portion 60 built up on the periphery of outer race 58 and shaped to engage the arcuate groove or channel of track 33. Movement of member 42 relative to track 33 is thus resisted only by rolling friction and may accordingly be actuated by handle 43 with utmost ease. It will be understood that rollers 44, 45 and 46 may have grooved peripheries, if desired, and that beaded tracks might be provided for cooperation therewith.

A cutter- or tool-holder 61 may be secured to carriage member 42 by any suitable means, such as stud bolt 62 (Fig. 5) which extends through an opening 63 in said member and threadedly engages a threaded recess in a hub portion 64 of the holder, the head of said bolt being housed in a recess 65 in member 42. For maintaining holder 61 against rotation relative to member 42, hub 64 has a diametrically extending key portion 66 (Fig. 4) that is formed integral therewith and registers with a slot or recess 67 in said member.

Slidably mounted in a channel-shaped slot in holder 61 is a plate 68, on the lower end of which a cutting tool 69 is secured. Means for adjustably holding plate 68 and, hence, knife 69 in a desired position relative to holder 61 are provided and, in the form shown, said means include a coil spring 70 (Fig. 3) which is housed in a bore 71 in said holder and engages the lower surface of a lug 72 projecting laterally from said plate. The upper surface of said lug is preferably provided with a recess, having the outline of an inverted pyramid, into which the lower squared end (Fig. 8) of a thumb screw 73 extends, the latter being threaded into the upper end of bore 71. The position in which plate 68 and tool 69 is held by spring 70 is accordingly determined by the position of screw 73 and the latter is yieldingly held against rotation by its engagement with the recess in lug 72.

Any suitable means may be provided for gauging or controlling the depth of incisions 25 to thereby insure the cutting of incisions having equal and uniform depth and to insure against making the same too deep. In the form shown, said means are constituted by a ball-bearing mounted roller 74 which is adapted to engage the surface of tire 14. Said roller has a shrink fit on the outer race 75 of a ball-bearing, the inner race 76 of which is securely mounted on hub 64. The depth of incisions 25 may thus be predetermined by regulating the distance which knife 69 extends below the periphery of roller 74, said distance being governed by the position of screw 73. Guide roller 74 being mounted by means of a roller bearing offers very little resistance to the movement of carriage 42 and, hence, knife 69, across tire 14.

In order to regulate the length of incisions 25, when it is desired to make the same shorter than the width of tire 14 and to prevent rollers 44 and 46 from running beyond the ends of track 33, suitable stop means may be provided. One form of said stop means is shown at the left in Fig. 3 as comprising a block 77 which fits into the channel of track 33 and is held in position by a screw 78. The inner end of said block has a curved recess 77a into which wheel 45 is adapted to ride. The radius of curvature of the wall of said recess is preferably about twice the radius of said wheel. It will be seen that, when wheel 45 butts against stop 77, the stopping of the carriage will be cushioned by the yielding action of spring 53, the tendency of the shock being to press members 42 and 50 together by reason of the coaction between wheel 45 and surface 77a. The same type of stop may be provided at both ends of track 33 or adjustable stops 79 may be provided at both ends thereof. Said stop 79 is similar to stop 77 but is somewhat U-shaped in section (Fig. 7) and adapted to be held in adjusted position at any point along said track by a set screw 80. The movement of carriage 42 may also be limited, if desired, by a stop 81 which is secured to track 33 in the path of lug 52 on said carriage.

In the operation of the illustrated embodiment of the invention, tire 14 is placed on rollers 13, in the position illustrated in Fig. 1, and bar 19 is then lowered by manipulating hand-wheel 22 to bring roller 16 into firm driving engagement with the top of said tire. Track 33 is adjusted laterally by moving member 31 along arm 30a until pointer or lug 37 is vertically above the center of tire 14 and the operative then grasps handle 43 and moves carriage 42, which supports guide roller 74 and cutter 69, to the left as seen in Fig. 1, until said roller engages the tire. Roller 74 is held against slight pressure by spring 39 in engagement with the tire during continued movement of the carriage to the left while knife 69 cuts an incision 25, the depth of said incision being measured by the distance which the knife extends below the periphery of the roller. The entire track and carriage assembly is then lifted by the operative, said assembly pivoting with bracket 30 about pivot 30', and is moved back to its original position. After the tire has been moved through a predetermined angle, depending on the desired spacing of the incisions, by manipulating lever 28 in the manner fully described above, the cycle of operation is again repeated. If desired, cutting tool 69 may be constructed to cut the tire when the carriage is moved in either direction. Said tool may also be in the form of a knife having a single blade for slitting rather than grooving the tire. When it is desired to cut diagonal incisions, as distinguished from transverse incisions, as shown in Fig. 1, the direction of track 33 is altered by loosening bolt 34 and pivoting the track about the bolt 35.

There is thus provided a novel tire treating machine embodying novel supporting means for the cutting tool thereof, whereby said tool may be moved in the desired manner with a minimum of frictional resistance. Said novel supporting means is adapted for use in movably supporting various other elements, such as sliding doors, for example, and is so constructed as to obviate binding and to prevent looseness between the track and carriage as a result of wear. The novel support provided may also be readily and inexpensively manufactured and assembled and is efficient and reliable in use.

Although only a single embodiment of the invention has been illustrated and described, it is to be expressly understood that the same is not limited thereto. For example, the novel support or carriage above described may be combined with a straight track instead of the illustrated curved track and more than one carriage may be employed for movably supporting a single member on the same track or guide. The bearing or track surfaces may also be provided on separate track elements instead of being formed on a single channel-shaped member. Various other changes may be made in the design and arrangement of parts illustrated without departing from the spirit and scope of the invention, as will now be understood by those skilled in the art. For a definition of the limits of the invention, reference will be had primarily to the appended claims.

What is claimed is:

1. In apparatus of the class comprising a frame for rotatably supporting a tire, means for rotating said tire and a support pivotally mounted on said frame, the combination therewith of track means having a plurality of bearing surfaces mounted on said support, a carriage movably supported by said track means comprising a pair of pivotally connected members, a roller on each of said members engaging one of said surfaces, a second roller on one of said members intermediate said first-named rollers and engaging the other of said surfaces and means interposed between said members and yieldingly holding said rollers in engagement with said surfaces, and a cutting tool mounted on said carriage and adapted to engage said tire for cutting incisions therein.

2. In apparatus of the class comprising means for rotatably supporting a tire, means for rotating said tire, track means having a plurality of bearing surfaces and means for supporting said track means adjacent said tire, the combination therewith of a carriage supported by said track means comprising a pair of members, means pivotally connecting said members, a plurality of rollers rotatably mounted on said members and resilient means interposed between said members for yieldingly holding said rollers in engagement with said surfaces, and a tire treating tool supported by said carriage and adapted to engage said tire.

3. In apparatus of the class described, track means having a plurality of bearing surfaces, an elongated member, an element secured to said member intermediate the ends of the latter, roller means adjacent one end of said member engaging one of said surfaces, roller means intermediate the ends of said member engaging the other of said surfaces, resilient means interposed between said element and said member adjacent the other end of the latter, and roller means on said element engaging said surface engaged by said first-named roller means.

4. In apparatus of the class comprising a frame for rotatably supporting a tire, means for rotating said tire and a support pivotally mounted on said frame, the combination therewith of track means having a plurality of bearing surfaces mounted on said support, a carriage movably supported by said track means comprising a pair of members, a roller on each of said members engaging one of said surfaces, a second roller on one of said members intermediate said first-named rollers and engaging another of said surfaces and means interposed between said members for yieldingly holding said rollers in engagement with said surfaces, a cutting tool mounted on said carriage and adapted to engage said tire for making incisions therein, and means rotatably mounted on said carriage and adapted to engage said tire for controlling the depth of said incisions.

5. In apparatus of the class comprising means for rotatably supporting a tire, means for rotating said tire, track means having a plurality of bearing surfaces and means for supporting said track means adjacent said tire, the combination therewith of a carriage supported by said track means comprising a pair of members, means pivotally connecting said members, a plurality of rollers rotatably mounted on said members and resilient means interposed between said members for yieldingly holding said rollers in engagement with said surfaces, means supported by said carriage for making incisions in the surface of said tire, and means rotatably mounted on said carriage and adapted to engage said tire for determining the depth of said incisions.

6. In apparatus of the class comprising means for rotatably supporting a tire, track means and means for supporting said track means adjacent said tire, the combination therewith of a carriage, roller means movably supporting said carriage on said track means, means for moving said carriage across said tire, and means supported by said carriage for making incisions in the surface of said tire, said track means being adjustable whereby said incisions may be made either diagonally or transversely of said tire.

7. In apparatus of the class described, track means having a plurality of bearing surfaces, and a carriage movably supported by said track means comprising an elongated means having a portion adjacent one end thereof engaging one of said surfaces and a portion intermediate the ends thereof engaging the other of said surfaces, means pivotally secured to said elongated means and having a portion engaging said first-named one of said surfaces and yielding means interposed between said pivotally connected means.

8. In apparatus of the class described, a frame for rotatably supporting a tire, means for rotating said tire, a support pivotally mounted on said frame, yielding means tending to resist movement of said support toward said tire, track means mounted on said support, a carriage movably supported by said track means, and a tire treating tool mounted on said carriage and adapted to engage said tire.

9. In apparatus of the class comprising means for rotatably supporting a tire, track means and means for supporting said track means adjacent said tire, the combination therewith of a carriage, roller means movably supporting said carriage on said track means, means for moving said carriage across said tire, and means supported by said carriage for making incisions in the surface of said tire.

10. In apparatus of the class comprising means for rotatably supporting a tire, track means and means for supporting said track means adjacent said tire, the combination therewith of a carriage, roller means movably supporting said carriage on said track means, means for moving said carriage across said tire, means supported by said carriage for making incisions in the surface of said tire, and means for controlling the maximum depth of said incisions.

11. In apparatus of the class described, track means comprising two oppositely disposed bearing surfaces, a pair of pivotally connected means, and yielding means interposed between said pair of pivotally connected means and tending to hold a portion of one of said pair in engagement with both of said surfaces.

12. In apparatus of the class described, a track having two oppositely disposed bearing surfaces, and a carriage movably supported on said track comprising a pair of pivotally connected means having portions on opposite sides of the pivotal connection therebetween engaging one of said surfaces and one of said pair having a portion intermediate said first-named portions engaging the other of said surfaces, and resilient means interposed between said pivotally connected means.

13. In apparatus of the class comprising means for rotatably supporting a tire, means for rotating said tire, track means having a plurality of bearing surfaces and means for supporting said track means adjacent said tire, the combination therewith of a carriage movably supported by said track means comprising an elongated means having a portion adjacent one end thereof engaging one of said surfaces and a portion intermediate the ends thereof engaging the other of said surfaces, means pivotally secured to said elongated means and having a portion engaging said first-named one of said surfaces, and yielding means interposed between said pivotally connected means for yieldingly holding said portions in engagement with said surface, and means supported by said carriage for making incisions in the surface of said tire.

14. In apparatus of the class comprising means for rotatably suporting a tire, means for rotating said tire, track means having a plurality of bearing surfaces and means for supporting said track means adjacent said tire, the combination therewith of a carriage movably supported by said track means comprising an elongated means having a portion adjacent one end thereof engaging one of said surfaces and a portion intermediate the ends thereof engaging the other of said surfaces, means pivotally connected to said elongated means and having a portion engaging said first-named one of said surfaces and yielding means interposed between said pivotally connected means for yieldingly holding said portions in engagement with said surface, means supported by said carriage for making incisions in the surface of said tire, and means on said carriage for determining the maximum depth of said incisions.

15. In apparatus of the class described, a channel-shaped track having oppositely disposed bearing surfaces, and a carriage supported by said track comprising a pair of pivotally connected members, a pair of rollers on one of said members, each of said rollers engaging a different one of said surfaces, a roller on the other of said members engaging one of said surfaces, and resilient means under compression interposed between said members for holding said rollers in engagement with said surfaces.

16. In apparatus of the class described, a track having a pair of bearing surfaces, and a carriage comprising two pivotally connected means having portions thereof engaging one of said surfaces and one of said last-named means having a portion intermediate said first-named portions engaging the other of said surfaces and resilient means interposed between said pivotally connected means for yieldingly maintaining said portions in engagement with said surfaces.

17. In apparatus of the class described, means for rotatably supporting a tire, track means, means for supporting said track means adjacent said tire, a carriage, roller means mounted on said carriage by means of roller bearings and movably supporting said carriage on said tracks, means for moving said carriage on said track means across said tire, and means supported by said carriage for making incisions in the surface of said tire.

18. In apparatus of the class described, track means, and a carriage movably supported thereby comprising a plurality of pivotally connected members, stop means for limiting the movement of said carriage on said track means and cushioning means interposed between said members and adapted to yield when said carriage engages said stop means.

19. In apparatus of the class described, a pair of oppositely disposed tracks, and a carriage movably supported by said tracks and comprising a pair of members, a roller on each of said members engaging one of said tracks, a second roller on one of said members intermediate said first-named rollers and engaging the other of said tracks and means for yieldingly holding said rollers in engagement with said track.

20. In apparatus of the class described, track means having a plurality of bearing surfaces, and means movably supported by said track means comprising a pair of pivotally connected members, a roller on each of said members engaging one of said surfaces, a second roller on one of said members intermediate said first-named rollers and engaging the other of said surfaces and means interposed between said members for yieldingly holding said rollers in engagement with said surfaces.

WILLIAM F. ERRIG.
EDWARD S. DE HART.